May 6, 1958

J. R. PARSONS 2,833,928

ANALYZER

Filed July 17, 1952

INVENTOR.
J. R. PARSONS
BY
Hudson + Young
ATTORNEYS

May 6, 1958   J. R. PARSONS   2,833,928
ANALYZER
Filed July 17, 1952   4 Sheets-Sheet 2

INVENTOR.
J. R. PARSONS
BY Hudson & Young
ATTORNEYS

INVENTOR.
J. R. PARSONS
BY Hudson & Young
ATTORNEYS

INVENTOR.
J. R. PARSONS
BY Hudson & Young
ATTORNEYS

United States Patent Office 2,833,928
Patented May 6, 1958

2,833,928
ANALYZER

James R. Parsons, Bartlesville, Okla., assignor to Phillips Petroleum Company, a corporation of Delaware Application July 17, 1952, Serial No. 299,515

10 Claims. (Cl. 250—43.5)

This invention relates to means for measuring the radiation absorption characteristics of a fluid. In another aspect it relates to improved amplifying means for measuring the unbalance of a Wheatstone bridge circuit. In still another aspect it relates to a sample inlet control system for use with a multi-stream analyzer.

Analysis instruments recently have been developed based upon the principle that heteratomic molecules, i. e. those molecules containing more than one kind of element, have the property at room temperature or thereabout of absorbing light energy in the infrared spectrum at only certain wave lengths which are characteristic of the molecule under consideration. A relatively simple analyzer can be provided by directing two beams of infrared radiation from a common source through a common sample cell to strike suitable radiation detectors. By placing a pure sample of the substance whose presence is being determined in a filter cell disposed in one beam of the radiation, any difference in intensity of the two beams impinging upon the respective detectors is indicative of the concentration of that particular sample material in the stream under test. Analyzers of this type are of particular value in the petroleum and chemical industries for recording and control purposes wherein the continuous analysis of a particular component of a fluid stream is required.

It has been found, however, that the various commercially available infrared analyzers fail to give the accuracy needed for precise control operations. One particular difficulty is a definite and noticeable drift caused by factors such as variations in temperature of the air, aging of circuit components, and fogging of the windows by which the radiation is admitted to the sample cell. These factors all tend to produce changes in the recorded analysis independent of variations in the composition of the stream under test. A further difficulty is that the amplifiers employed to amplify the unbalance bridge signal do not possess the sensitivity needed for accurate analysis.

In accordance with the present invention there is provided an improved analysis instrument employing valve control and stream marking means to pass sequentially a plurality of inlet sample fluids to the common sample cell of a single infrared analyzer. By this procedure a single analyzer can be employed to analyze several similar processes. In addition, means are provided for rebalancing in an automatic manner the electrical bridge circuit to compensate for variations in ambient temperature and other factors likely to cause error. The analyzer employed is a double beam instrument wherein two beams strike respective radiation sensitive elements forming arms of an alternating current Wheatstone bridge. Any electrical unbalance of the bridge due to differences in intensity of radiation striking the arms is amplified and applied to motor driven means which adjust balancing impedances in the bridge circuit to restore a balanced condition. The amplifier used in this connection is adapted to amplify selectively only a selected frequency in order to reduce errors caused by thermal noise and extraneous electrical signals which may enter the bridge circuit through stray capacitance, leakage resistance, and external magnetic fields.

Accordingly, it is an object of this invention to provide a precision analysis instrument adapted to measure the composition of a plurality of sample streams.

Another object is to provide sample inlet and stream marking means for use with analytical instruments.

A further object is to provide amplifying means for use in conjunction with motor-driven, self-balancing bridge detecting circuits.

A still further object is to provide an improved frequency selective amplifier.

Various other objects, advantages, and features of this invention will become apparent from the following detailed description taken in conjunction with the accompanying drawings in which.

Figure 1:
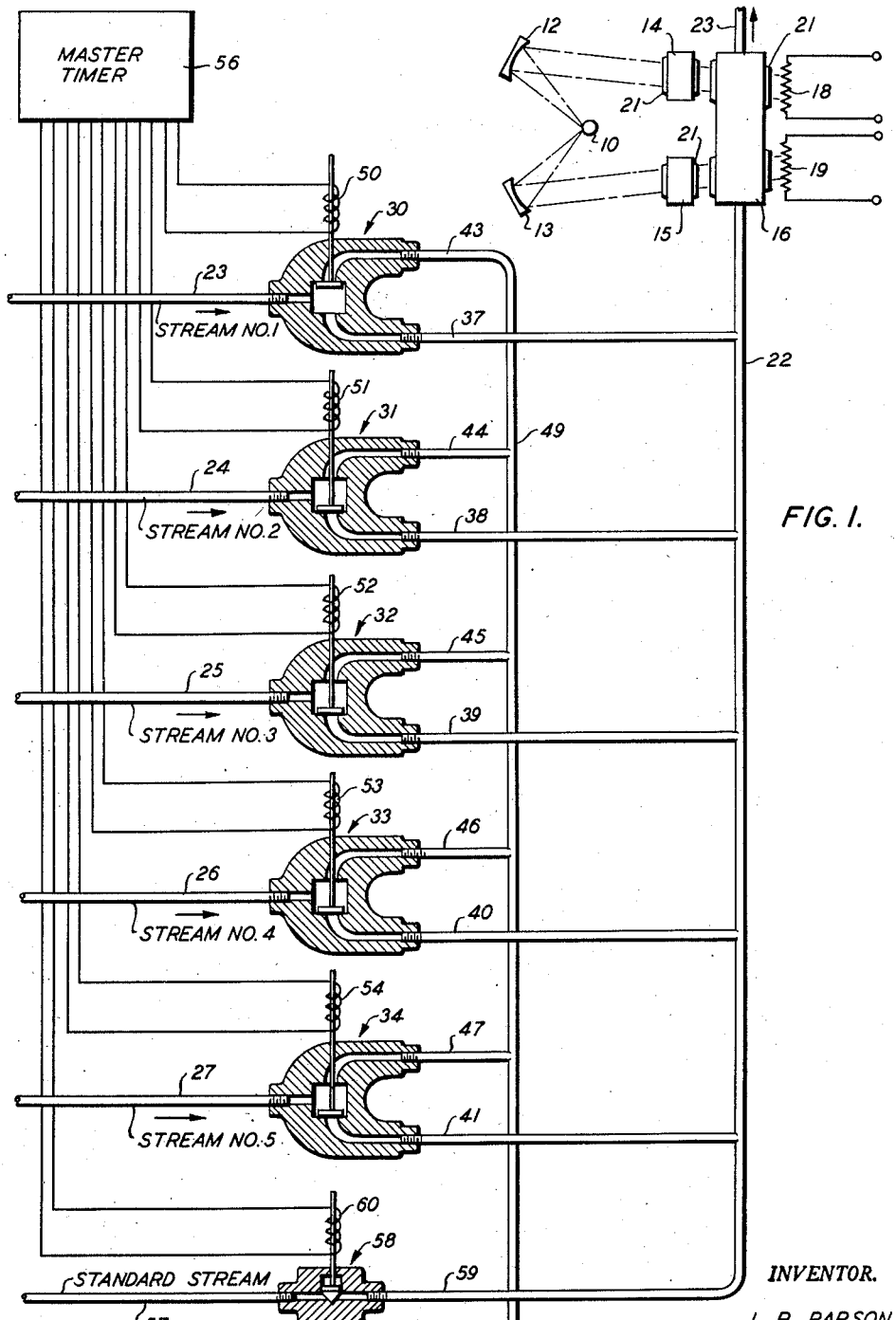
Figure 1 is a schematic view of the valve system for passing a plurality of sample streams seqeuntially to the analyzer unit.

Referring to the drawing in detail and to Figure 1 in particular, there is shown a source 10 of infrared or other suitable radiation from which two beams are directed against a pair of concave reflectors 12 and 13. From reflectors 12 and 13 the respective radiation beams are reflected and passed through a pair of cells 14 and 15, and through a common cell 16 to a pair of radiation sensitive elements 18 and 19, such as bolometers, thermistors, or the like. The various cells are provided with windows 21 which are transparent to the radiation employed. In the case of infrared radiation windows 21 can be formed of a halide such as silver chloride, calcium fluoride, sodium chloride, or from quartz. Cell 14, which can be formed from Pyrex glass, spinel, or quartz, preferably is filled with a pure material or mixture of materials having a principal radiation absorption band at the same wave length as the principal absorption band of the material or component to be measured in the test stream, while like constructed cell 15 contains air or other substance transparent to the radiation, or cell 15 can contain a gas whose absorption bands are such as to reduce interference from other components. The fluid under test is admitted to sample cell 16 by a conduit 22 and leaves the cell through a conduit 23.

The beams of radiation incident upon elements 18, 19 produce temperature changes which in turn vary the electrical resistance of the elements. With the apparatus arranged as illustrated any differential in resistance between the two elements is indicative of the amount or percentage of the desired pure material or component in the mixture passing through the sample cell, provided this pure material or component has a principal absorption band at the same wave length as the fluid in cell 14. The apparatus for producing an impedance differential between two elements, which differential is proportional to the percentage of the component under test, is, however, well known in the art and forms no part of the present invention. Furthermore, other types of radiation such as monochromatic light or ultraviolet radiation can be employed in like manner so long as an impedance change is produced in the radiation sensitive elements by variations in the composition of the test sample.

For purposes of illustration it will be assumed that the analyzer is to be employed to measure sequentially the percentage of a given component in five sample streams. These are designated as streams 1–5 and enter the analyzer system through respective inlet conduits 23–27. Conduits 23–27 communicate with the inlets of respective solenoid operated valves 30–34. Valves 30–34 are provided with respective first outlet conduits 37–41 which communicate with cell inlet conduit 22, and with respective second outlet conduits 43–47. These latter conduits communicate with a common conduit 49 for venting those sample streams not being passed to sample cell 16 at any given time. Valves 30–34 are actuated by solenoid coils 50–54, respectively, which in turn are energized through a master timer 56 as illustrated in greater detail in Figure 2. Valves 30–34 are biased such that in the absence of energizing current being applied through coils 50–54, inlet conduits 23–27 communicate directly with respective venting outlet conduits 43–47. The application of energizing current to the solenoid coil associated with any of valves 30–34 serves to actuate that particular valve such that the inlet fluid stream applied thereto passes directly into conduit 22 instead of conduit 49. As illustrated, energizing current is being applied to solenoid coil 50 to pass sample stream No. 1 into cell 16, the remaining streams 2–5 being passed to venting conduit 49.

In order to compensate for factors such as temperature changes and aging of the circuit components, means are provided for standardizing the apparatus periodically. To this end a standard stream S is admitted to the analyzer unit through inlet conduit 57. Conduit 57 communicates through a solenoid operated valve 58 with conduit 59, which in turn is connected to common inlet conduit 22 of cell 16. Valve 58 is operated by a solenoid coil 60, which also is energized through master timer 56. Valve 58 normally remains closed, but is opened periodically to pass the standardizing fluid into cell 16.

Figure 2:
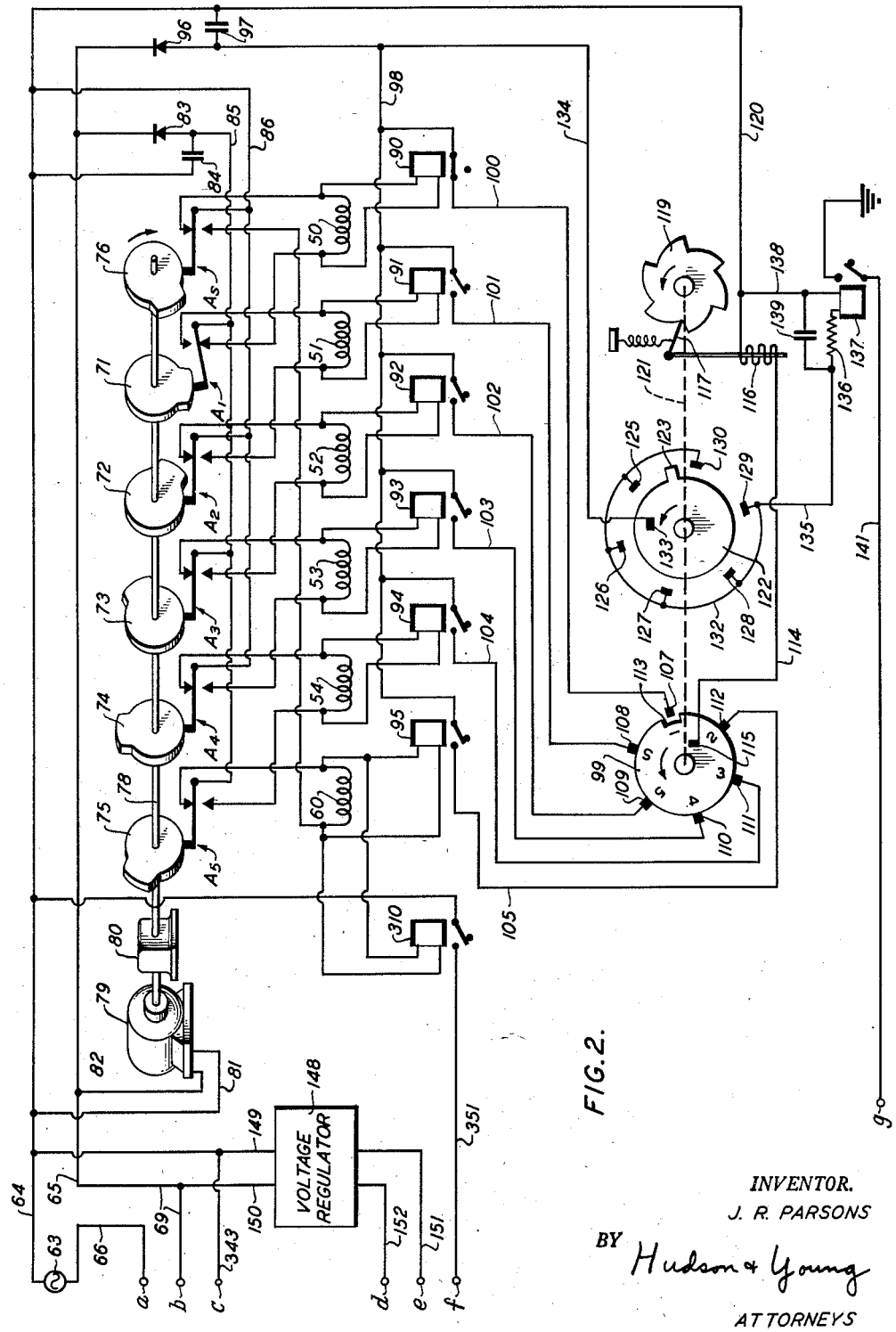
Figure 2 is a schematic view of the valve control timing and sample stream marking apparatus.

Master timer 56 is illustrated in greater detail in Figure 2. This timer, as well as the entire analyzer, is energized from a source of alternating voltage 63 having one terminal connected to a lead 64 and the other terminal connected to a lead 65 through a lead 66, terminal $a$, switch 68 (see Figure 3), terminal $b$, and lead 69. Terminal $a$ and other terminals designated by small letters are provided throughout the drawing to illustrate interconnection between the various figures. Master timer 56 comprises six cams 71–76 mounted for rotation about a common shaft 78. These cams sequentially engage respective contact arms of switches $A_1$, $A_2$, $A_3$, $A_4$, $A_5$, and $A_s$, which can be of the type disclosed in U. S. Patent No. 1,960,020, to supply energizing current to associated solenoid coils 50–54 and 60. Cam shaft 78 is rotated by a motor 79 connected thereto through reduction gearing 80. Motor 79 is connected across voltage leads 64 and 65 by leads 81 and 82, respectively.

A source of direct current voltage for energizing solenoid coils 50–54 and 60 is provided by a rectifier 83 having one terminal connected to lead 65 and the other terminal connected through a capacitor 84 to lead 64. A lead 85, connected to the junction between rectifier 83 and capacitor 84, is applied to the contact arms of switches $A_1$, $A_3$ and $A_5$. The contact arms of switches $A_2$, $A_4$ and $A_s$ are connected to a lead 86 which is connected to voltage lead 64. First end terminals of solenoid coils 50–54 and 60 are connected to lower contacts of respective switches $A_1$, $A_2$, $A_3$, $A_4$, $A_5$ and $A_s$ such that said first end terminals are in contact with the respective contact arms of said switches at such times as the raised portions of the respective cams are in contact therewith. The second end terminals of solenoid coils 50–54 and 60 are connected to upper contacts of respective switches $A_s$, $A_1$, $A_2$, $A_3$, $A_4$, and $A_5$ such that said second end terminals are in contact with the respective contact arms of said switches at such times as the raised portions of the respective cams are not in contact therewith. The raised portions of cams 71–76 are spaced with respect to one another such that substantially only one such raised portion engages a respective contact arm at any given time. However, the cams are constructed such that each cam raised portion engages its respective contact arm approximately $\frac{1}{60}$ revolution before the preceding cam raised portion disengages its respective contact arm. This "cocking" action insures that at least one solenoid coil is energized at all times.

Because of the inherent explosive danger in the vicinity of petroleum and chemical processing apparatus to which the analyzer of this invention is particularly applicable, the electrical components normally are enclosed within an explosion-proof housing. Accordingly, it is desirable that means be provided for indicating visually the particular sample stream being supplied to the analyzer at any given time. To this end a novel stream indicating system is employed whereby a marked rotatable disk 99 constructed of an electrical conductive material is positioned in front of a small transparent window, not shown, in the explosion-proof housing. Disk 99 thus is rotated in accordance with the particular stream entering the analyzer and a corresponding number marked thereon appears before the transparent window. A series of six relays 90–95 is connected with the coils thereof being connected in parallel with respective solenoid coils 50–54 and 60. A second source of direct voltage for rotating disk 99 is provided by a rectifier 96 and condenser 97 connected in series between leads 65 and 64. A lead 98, connected to the junction between rectifier 96 and capacitor 97, is connected to the armature of each of relays 90–95. The non-energized position terminals of relays 90–95 are connected by respective leads 100–105 to respective brushes 107–112 which make contact with the edge of disk 99. Disk 99 is provided with a depression 113 in the periphery thereof such that when this depression 113 is opposite any one of the brushes 107–112 electrical contact between disk 99 and that particular brush is broken. A lead 114 is connected to a brush 115, which makes continuous contact with disk 99, and to one end terminal of a solenoid coil 116 which actuates a pawl 117 to turn a ratchet wheel 119. The second end terminal of solenoid coil 116 is connected by a lead 120 to lead 64.

Closure of any of contact sets $A_1$, $A_2$, $A_3$, $A_4$, $A_5$, or $A_s$ results in current flow through the respective relay coil 90, 91, 92, 93, 94, or 95. As illustrated, contact set $A_1$ is closed by cam 71 which results in sample stream No. 1 flowing through cell 16 of the analyzer. Closure of contact set $A_1$ also passes energizing current through the coil of relay 90 thereby connecting leads 98 and 100. At this initial position depression 113 in disk 99 is opposite brush 107, and numeral 1 on disk 99 is opposite the viewing window. At the second position of switch 56 cam 72 is rotated to close contact set $A_2$ and cam 71 is rotated to open contact set $A_1$. Closure of contact set $A_2$ results in lead 98 being connected to lead 101. Because brush 108 then is in electrical contact with disk 99 a circuit path is completed from lead 98 through brush 108, brush 115, lead 114, and coil 116 to lead 120. The passage of current through solenoid coil 116 results in a downward movement of pawl 117 so as to rotate ratchet wheel 119 in a counterclockwise direction. Ratchet wheel 119 and disk 99 are connected to a common shaft 121 such that rotation of ratchet wheel 119 rotates disk 99 thereby moving depression 113 opposite brush 108 to break electrical contact between disk 99 and brush 108. At this point numeral 2 on disk 99 has rotated to a position in front of the viewing window to indicate that stream No. 2 is being passed into cell 16.

The output electrical signal from the analyzer unit normally is applied to a conventional recording instrument. Consequently, it is desirable that an indication be made of the time at which the analyzer is switched from one stream to another. This is accomplished by means of a second rotatable disk 122 constructed of an electrical conductive material and having a key 123 protruding from the edge thereof. Disk 122 also is mounted on a shaft 121 with ratchet wheel 119 and disk 99, and has a brush 133 in continuous contact therewith, said brush 133 being connected by a lead 134 to lead 98. A series of six brushes 125–130 are spaced symmetrically about the periphery of disk 122 but not in contact therewith. Brushes 125–130 each are connected to a common lead 132, which in turn is connected by a lead 135 and resistor 136 to one end terminal of the coil of a relay 137, the second end terminal of relay 137 being connected by a lead 138 to lead 120. A capacitor 139 is connected in shunt across resistor 136 and the coil of relay 137. As illustrated, key 123 normally assumes a position between two of the adjacent brushes surrounding disk 122. However, rotation of ratchet wheel 119 during the transition from one stream to another rotates disk 122 such that key 123 passes by and makes contact with an adjacent brush. During the transition from stream No. 1 to stream No. 2 the contact of key 123 with brush 125 completes a circuit between leads 134 and 120 through the coil of relay 137. Actuation of relay 137 closes the armature thereof to connect one end of a lead 141 to ground. The other end of lead 141 is connected to a recording instrument 142 shown in Figure 3.

A voltage regulator 148 is employed to provide a regulated voltage for energizing the electrical circuit of the analyzer unit. The input terminals of voltage regulator 148 are connected to source 63 by leads 149 and 150, and the output regulated voltage is applied across leads 151 and 152.

Figure 3:
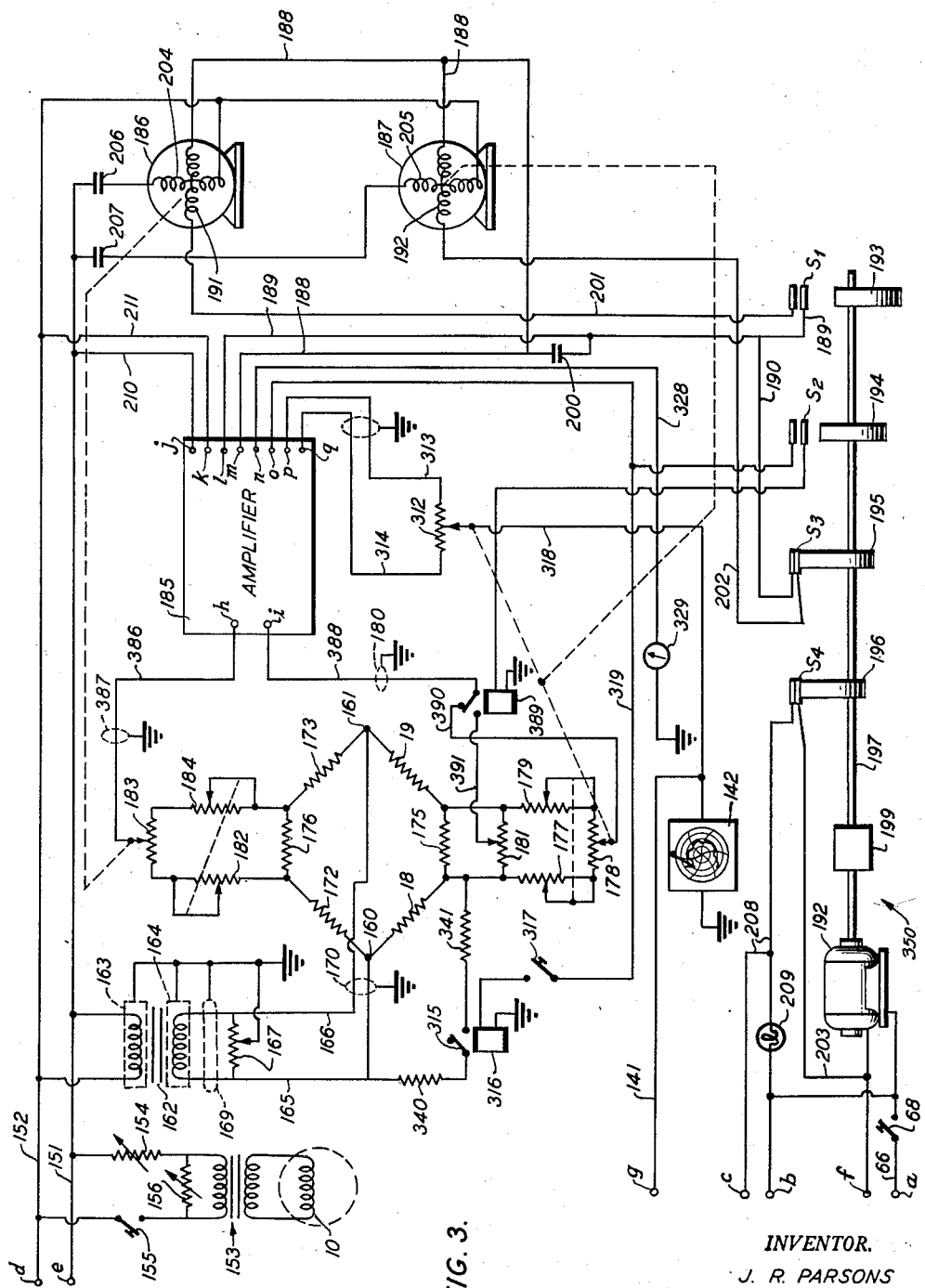
Figure 3 is a schematic view of the infrared analyzer and recorder.

In Figure 3 radiation source 10 is illustrated as being connected across the secondary winding of a transformer 153. The primary winding of transformer 153 is connected across leads 151 and 152 through a ballast resistor 154 and a switch 155. A variable resistor 156 is connected in shunt with the primary winding of transformer 153. Thus, a constant voltage is maintained across source 10. The regulated voltage between leads 151 and 152 also is connected across opposite terminals 160 and 161 of the Wheatstone bridge circuit through a transformer 162. Both the primary and secondary windings of transformer 162 are provided with shields 163 and 164, respectively, which are connected to a ground terminal as is the contactor of a potentiometer 167, the end terminals of potentiometer 167 being connected to leads 165 and 166 which in turn connect the secondary winding of transformer 162 with respective bridge terminals 160 and 161. Leads 165 and 166 also are provided with respective grounded shields 169 and 170.

Radiation sensitive elements 18, 19 are connected in a Wheatstone bridge circuit with balancing resistors 172 and 173 such that voltage terminal 160 is between element 18 and resistor 172, and voltage terminal 161 is between element 19 and resistor 173. A resistor 175 is connected between elements 18, 19, and a resistor 176 is connected between resistors 172 and 173. Resistor 175 is shunted by a unit including a variable resistor 177, a potentiometer 178, and a variable resistor 179, all connected in series. A potentiometer 181 has one end terminal thereof connected to the junction between resistors 175 and 177 and the other end terminal thereof connected to the junction between resistors 175 and 179. Resistor 176 is shunted by a unit including a variable resistor 182, a potentiometer 183, and a variable resistor 184, all connected in series.

When alternating potential is applied across terminals 160 and 161 of the bridge circuit, potentiometers 178 and 183 can be adjusted such that there is a zero potential difference therebetween; and, similarly, potentiometers 181 and 183 can be adjusted such that there is a zero potential therebetween. The bridge then is balanced so far as the contact arms of these potentiometers are concerned. Variable resistors 182 and 184 are connected to a common control shaft in such manner that rotation of the shaft increases the ohmic value of one of these resistors and decreases the ohmic value of the other. Thus, ganged resistors 182, 184 can be used as an auxiliary bridge balance control because rotation of the shaft increases the resistance on one side of potentiometer 183 and decreases the resistance on the other side of potentiometer 183. Variable resistors 177 and 179 also are connected to a common control shaft. Adjustment of this latter shaft, however, either increases or decreases the ohmic value of both resistors simultaneously thereby affording adjustment of the sensitivity of the bridge circuit. For example, when the resistance of units 177, 179 is high full scale movement of potentiometer 178 produces only a small variation in the balance point of the bridge due to the relatively large series resistance in circuit therewith. When the resistance of units 177, 179 is small adjustment of potentiometer 178 covers a wide range of balancing conditions because the series resistance in circuit therewith is relatively small.

The contactor of potentiometer 183 is connected to one input terminal $h$ of an amplifier 185 by means of a lead 386, the latter being enclosed in a grounded shield 387. The other input terminal $i$ of amplifier 185 is connected by a lead 388 to the armature of a relay 389. Lead 388 is enclosed in a grounded shield 180. In the absence of energizing current passing through the coil of relay 389 the armature of relay 389 makes contact with a lead 390 which connects the contactor of potentiometer 178 to amplifier input lead 388. When energizing current passes through the coil of relay 389 the armature of relay 389 makes contact with a lead 391 which is connected to the contactor of potentiometer 181.

The output signal from amplifier 185 selectively energizes a pair of motors 186 and 187, the output rotations of which are coupled mechanically to the respective contactors of potentiometers 183 and 178. To this end one output terminal $m$ of amplifier 185 is connected by a lead 188 to one terminal of each of said motors 186 and 187, and a second output terminal $l$ is connected by leads 189 and 190 to first terminals of respective contact sets $S_1$ and $S_3$ of a sequence timer cam operated switch 350. Leads 188 and 189 are coupled by a capacitor 200. Switch 350 includes four contact sets $S_1$, $S_2$, $S_3$, and $S_4$ actuated by respective cams 193–196. These cams are mounted on a common shaft 197 which is rotated by a motor 192 connected thereto through reduction gearing 199. Motor 192 is energized from voltage source 63 through a first lead 66 and through a second lead 343 which is connected to lead 149 through contact set $S_4$ and a lead 208. A pilot light 209 is connected between terminal $b$ and lead 343. The second terminal of contact set $S_1$ is connected to a terminal of motor 186 by a lead 201 and the second terminal of contact set $S_3$ is connected to a terminal of motor 187 by a lead 202. The terminals of contact set $S_2$ are connected respectively to one end terminal of the coil of relay 389 and to the output terminal $o$ of amplifier unit 185.

Both motors 186 and 187 are two-phase induction motors. Motor 186 is provided with a first winding 204 connected across power leads 151, 152 in series with a capacitor 206 and with a second winding 191 connected across leads 188, 201. Motor 187 is provided with a first winding 205 connected across power leads 151, 152 in series with a capacitor 207 and with a second winding 192 connected across leads 188, 202. When contact set $S_1$ is closed the output of amplifier is applied to motor 186 and when contact set $S_3$ is closed the output of amplifier 185 is applied to motor 187. As more fully described hereinafter the output of amplifier 185 is such that motors 186 and 187 are rotated in one direction when the signal from the bridge indicates an unbalance in one direction and are rotated in the opposite direction when the bridge is unbalanced in the opposite manner.

Figure 4:
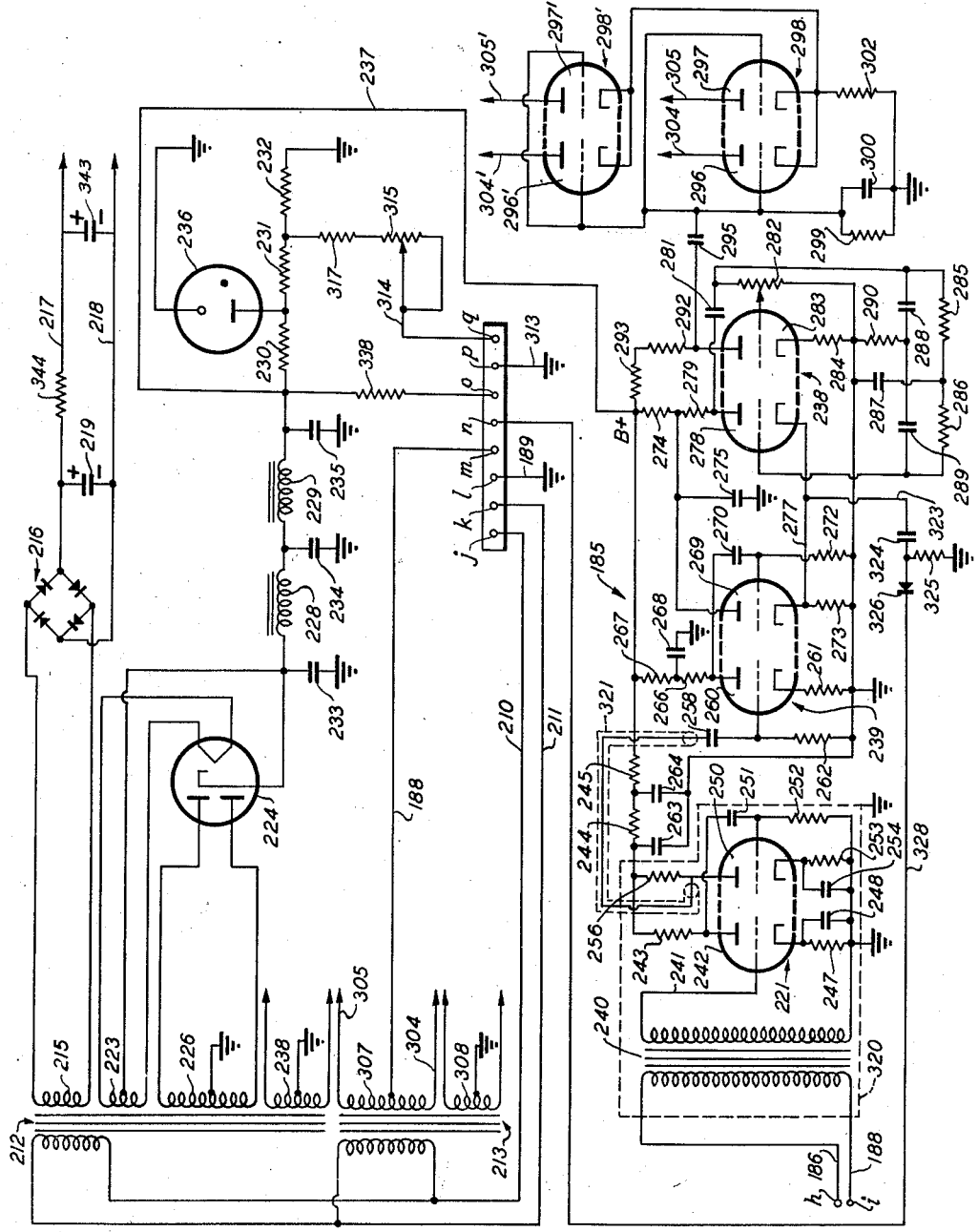
Figure 4 is a schematic circuit diagram of the amplifier employed in Figure 3.

Amplifier 185 and the power supply circuit associated therewith is illustrated in detail in Figure 4. The alternating voltage from regulator 148 is applied by leads 151, 152 and leads 210, 211 to the primary windings of transformers 212 and 213. A first secondary winding 215 of transformer 212 is connected across opposite terminals of a full wave rectifier bridge 216. Leads 217 and 218 are connected across the remaining pair of opposite terminals of bridge 216 to deliver a source of direct voltage to the heaters, not shown, of double triode tube 221 in amplifier 185. Filter capacitors 219 and 343 are connected between leads 217 and 218 and a resistor 344 is connected in series with lead 217. The end terminals of a second secondary winding 223 of transformer 212 are applied to the filament heater of a double rectifier tube 224, and a center tap of winding 223 is connected to the common cathode of rectifier 224. The end terminals of a third secondary winding 226 of transformer 212 are connected to the respective anodes of double rectifier 224, and a center tap of winding 226 is grounded. Tube 224 thus functions as a full wave rectifier, the common cathode of which is connected to ground through series connected filter inductors 228, 229 and resistors 230, 231 and 232. A first filter capacitor 233 is connected between the cathode of tube 224 and ground; a second filter capacitor 234 is connected between the junction of inductors 228, 229 and ground; and the third filter capacitor 235 is connected between ground and the common junction of inductor 229, resistor 230. A voltage regulating diode 236 has its anode connected between the junction of resistors 230, 231 and its cathode connected to ground. The positive potential appearing at the junction between inductor 229, resistor 230 is applied by a lead 237 to form the B+ voltage supply of amplifier 185. The junction between inductor 229 and resistor 230 also is connected to terminal o through a resistor 338. A fourth secondary winding 238 of transformer 212, having its center terminal grounded, supplies heater current to the filaments of double triodes 239 and 238 of amplifier 185.

The input signal to amplifier 185 is applied across the end terminals of the primary winding of a transformer 240. One end terminal of the secondary winding of transformer 240 is connected to ground and the second end terminal of said secondary transformer winding is connected by a lead 241 to the control grid of a triode vacuum tube 242. The anode of tube 242 is connected through series resistors 243, 244, 245 to the B+ voltage terminal. The cathode of tube 242 is connected to ground through a resistor 247 having a capacitor 248 connected in shunt therewith. The anode of tube 242 also is connected to the control grid of a triode vacuum tube 250 through a capacitor 251. The control grid of tube 250 is connected to ground through a resistor 252, and the cathode of tube 250 is connected to ground through a resistor 253, the latter having a capacitor 254 connected in shunt therewith. The anode of tube 250 is connected through series resistors 256, 244, and 245 to the B+ voltage terminal, and also through a capacitor 258 to the control grid of a triode vacuum tube 260. The cathode of tube 260 is connected to ground through a resistor 261 and the control grid of triode 260 is connected to ground through a resistor 262. A capacitor 263 is connected between the junction of resistors 256, 244 and ground and a capacitor 264 is connected between the junction of resistors 244, 245 and ground. The anode of tube 260 is connected to the B+ voltage terminal through series resistors 266 and 267, the junction between resistors 266, 267 being connected to ground through a capacitor 268. The anode of tube 260 also is connected to the control grid of a triode vacuum tube 269 through a capacitor 270. The control grid of tube 269 is connected to ground through a resistor 272 and the cathode of tube 269 is connected to ground through a resistor 273. The anode of triode 269 is connected to the B+ voltage terminal through a resistor 274 and to ground through a capacitor 275.

The cathode of tube 269 is connected directly to the cathode of a triode vacuum tube 278 by a lead 277. The anode of tube 278 is connected to the B+ voltage source through series resistors 279 and 274. The anode of tube 278 also is connected through a capacitor 281 to the first end terminal of a gain regulating potentiometer 282, the second end terminal of which is grounded. The contactor of potentiometer 282 is connected to the control grid of a triode vacuum tube 283. The cathode of tube 283 is connected to ground through a resistor 284. The junction between capacitor 281 and the first end terminal of potentiometer 282 is connected directly to the control grid of tube 278 through a parallel-T filter. The first path of this parallel-T filter comprises series resistors 285 and 286, the junction therebetween being grounded through a capacitor 287. The second path of this parallel-T filter comprises series capacitors 288 and 289, the junction therebetween being grounded through a resistor 290.

The anode of tube 283, which tube forms the last stage of amplifier 185, is connected through a capacitor 295 to the control grids of triode vacuum tubes 296 and 297. The control grids of tubes 296 and 297 are connected to one another and to ground through a resistor 299 having a capacitor 300 connected in shunt therewith. The cathodes of tubes 296 and 297 are connected to one another and to ground through a common resistor 302. The anodes of tubes 296 and 297 are connected by respective leads 304 and 305 to opposite end terminals of a first secondary winding 307 of transformer 213. The center tap of transformer winding 307 is connected by lead 188 to first windings 191 and 192 of motors 186 and 187, as hereinbefore described. If desired, a second pair of triode vacuum tubes 296' and 297' can be connected in parallel relationship with respective tubes 296 and 297. The control grids of tubes 296' and 297' are connected to one another and to the interconnected control grids of tubes 296 and 297. The cathodes of tubes 296' and 297' are connected to the cathodes of tubes 296 and 297 in like manner. The anodes of tubes 296' and 297' similarly are connected to the respective end terminals of transformer winding 307 by leads 304' and 305'. A source of heater current for tubes 296, 297, 296', and 297' is supplied by a second secondary winding 308 of transformer 213.

A telemetering potentiometer 312, Figure 3, is provided to transmit an electrical signal to recorder 142 which is indicative of the composition of the sample stream under analysis. One end terminal of potentiometer 312 is connected to ground by a lead 313 and the second end terminal of potentiometer 312 is connected to a point of positive potential at the junction of resistors 231, 232 by a lead 314, variable resistor 315, and resistor 317. The contactor of potentiometer 312 is connected to recorder 142 by a lead 318 and also is mechanically coupled to the output rotation of motor 187.

In order to adjust the analyzer initially cam switch $A_8$ first is moved to energize solenoid coil 60 and the coil of a relay 310 connected in parallel with solenoid coil 60. As such, standardizing fluid from inlet conduit 57 flows through conduits 59 and 22 to sample cell 16. During this period the remaining valves 30–34 are in their normally closed position such that the sample streams 1–5 entering through conduits 23–27 are vented through conduit 49. The contactor of potentiometer 183 then is set at some predetermined point such as near the middle of the scale. At this point cam shaft 197 is turned such that contact sets $S_1$ and $S_2$ are closed and contact set $S_3$ is open. Potentiometer 181 is moved manually until motor 186, which now is connected to the output of amplifier 185, drives potentiometer 183 to its mid-scale predetermined position.

The first sample stream then is passed into cell 16 of the analyzer unit by rotation of shaft 78 until the raised portion of cam 71 engages the contact arm of switch $A_1$. If the percentage of the component of interest is different in this first sample stream than in the standardizing sample the impedance of the elements 18, 19 will be changed with resultant unbalance of the bridge circuit. As is more fully described hereinafter, contact sets $S_1$ and $S_2$ are open during actual on-stream analysis and contact set $S_3$ is closed. The unbalance voltage appearing between the arms of the potentiometers 178 and 183 is fed to amplifier 185 such that motor 187 moves potentiometer 178 to restore the bridge to a balanced condition. The movement of the arm of potentiometer 178 necessary to balance the bridge is an indication of the percentage variation of the component under test from that in the standardizing sample. This variation is measured by movement of the contactor of telemetering potentiometer 312, and a voltage proportional thereto is applied to recorder 142. It should be understood that this electrical signal applied to recorder 142 can actuate control equipment in a manner well understood by those skilled in the art to change an appropriate process variable thereby restoring the composition of the process sample to a desired value.

The standardizing fluid from inlet conduit 57 periodically is fed to cell 16 and the setting of potentiometer 183 adjusted by motor 186 to compensate for resistance variations due to temperature changes, aging of the circuit components and other factors. When standardizing fluid is fed to cell 16 in this manner the input terminals of amplifier 185 are connected to the arms of potentiometers 183 and 181, and the output terminals of amplifier 185 are connected to motor 186. Normally the bridge should be balanced during this time because such was the original condition for which a balance was obtained. However, should the bridge be unbalanced for any reason the unbalance voltage is fed through amplifier 185 with the result that motor 186 moves potentiometer 183 to restore the bridge to a balanced condition. Thereupon the amplifier input terminals are once again connected to the arms of potentiometer 183 and 178 and the next sample stream is admitted to cell 16. The output of amplifier 185 is connected to motor 187 and additional determinations of the composition of the process stream are realized. It is a feature of this invention that the standardization cycle and the steps of switching from one sample stream to another takes place automatically. In the illustrated example the analyzer is adapted to analyze sequentially process streams 1–5. It has been found that satisfactory standardization can be accomplished in approximately five minutes of each hour without interfering with proper recording and analysis of the five streams under consideration. This leaves approximately eleven minutes for analysis of each of the individual streams. To carry out this operation cam operated switches 56 and 192 open and close their respective contacts in the sequence illustrated by the following table:

In the foregoing table the "up" and "down" contact arm positions of switches $A_1$, $A_2$, $A_3$, $A_4$, $A_5$ and $A_s$ refer to the illustration in Figure 2. As therein shown the contact arm of switch $A_1$ is in the down position such that solenoid coil 50 is energized. Steps 2, 4, 6, 8, 10 and 16 define the cocking action of the cam switch previously described. It should be noted all transitions of the various switches as indicated in the table occur at the beginning of each step.

During steps 1 and 2 stream No. 1 enters cell 16 through conduit 22. At this time the contact arm of switch $A_1$ is down and the contact arms of the remaining switches $A_2$, $A_3$, $A_4$, $A_5$ and $A_s$ are up to prevent passage of the respective streams into cell 16. Contact set $S_3$ is closed, and the remaining contact sets of switch 202, that is contact sets $S_1$, $S_2$, and $S_4$, are open which results in the voltage between the arms of potentiometers 178 and 183 being applied to the input terminals of amplifier 185. The output of amplifier 185 is applied to motor 187 which drives the arms of potentiometers 178 and 312 in accordance with changes in composition of sample stream No. 1 passing through cell 16. During steps 3–10 the contact sets of switch 350 remain in the same position such that the output of the amplifier drives motor 187 to record the percentage of the component of interest in the sample stream being passed through cell 16. During the steps corresponding to streams 2–5, however, contact arms of respective switches $A_2$, $A_3$, $A_4$, and $A_5$ are closed to pass the corresponding sample streams through cell 16.

At step 11 the actual standardization cycle begins by the energization of solenoid coil 60. This results in the standardizing fluid from inlet conduit 57 being passed into sample cell 16. It should be noted that the coil of relay 310 also is energized to start operation of sequence timer motor 192 by connection of voltage lead 64 to motor 192 by lead 351 and the switch associated with relay 310. During step 12 contact set $S_4$ closes to insure operation of motor 192 even after relay 310 is de-energized. At step 12 the actual standardization cycle begins by the opening of contact set $S_3$ and the closure of contact set $S_4$. During step 12 both contact sets $S_1$ and $S_3$ are open resulting in the output signal from amplifier 185 being fed to neither motor 186 nor motor 187. This step allows sample cell 16 to be purged before the actual standardization begins. During step 13 contact set $S_2$ is closed thereby energizing relay 389 such that the arm of potentiometer 181 is applied to input terminal $i$ of amplifier 185 in place of the arm of potentiometer 178. During step 9 contact set $S_1$ is closed such that the output of amplifier 185 is applied to motor 186. This in turn adjusts the position of the arm of potentiometer 183 as may be needed to standardize the instrument. During step 15 contact set $S_1$ again is open thereby ending the actual standardization period. During step 16 contact set $S_2$ is open to connect the arm of potentiometer 178 to input terminal $i$ of amplifier 185. During step 17

| | Step | Time Interval, minutes | Contact Arm Position | | | | | | Contact Set | | | |
|---|---|---|---|---|---|---|---|---|---|---|---|---|
| | | | $A_1$ | $A_2$ | $A_3$ | $A_4$ | $A_5$ | $A_s$ | $S_1$ | $S_2$ | $S_3$ | $S_4$ |
| 1 | Stream No. 1 | 0 to 10.33 | down | up | up | up | up | up | open | open | closed | open. |
| 2 | do | 10.33 to 11.00 | do | down | do | do | do | do | do | do | do | Do. |
| 3 | Stream No. 2 | 11.00 to 21.33 | up | do | do | do | do | do | do | do | do | Do. |
| 4 | do | 21.33 to 22.00 | do | do | do | down | do | do | do | do | do | Do. |
| 5 | Stream No. 3 | 22.00 to 32.33 | do | up | do | do | do | do | do | do | do | Do. |
| 6 | do | 32.33 to 33.00 | do | do | do | do | down | do | do | do | do | Do. |
| 7 | Stream No. 4 | 33.00 to 43.33 | do | do | up | do | do | do | do | do | do | Do. |
| 8 | do | 43.33 to 44.00 | do | do | do | do | down | do | do | do | do | Do. |
| 9 | Stream No. 5 | 44.00 to 54.33 | do | do | do | up | do | do | do | do | do | Do. |
| 10 | do | 54.33 to 55.00 | do | do | do | do | do | down | do | do | do | Do. |
| 11 | Standardization | 55.00 to 55.07 | do | do | do | do | up | do | do | do | do | Do. |
| 12 | do | 55.07 to 56.25 | do | do | do | do | do | do | do | do | open | closed. |
| 13 | do | 56.25 to 56.67 | do | do | do | do | do | do | do | closed | do | Do. |
| 14 | do | 56.67 to 57.50 | do | do | do | do | do | do | closed | do | do | Do. |
| 15 | do | 57.50 to 57.92 | down | do | do | do | do | do | open | do | do | Do. |
| 16 | do | 57.92 to 59.33 | do | do | do | do | do | do | do | open | do | Do. |
| 17 | do | 59.33 to 59.93 | do | do | do | do | do | up | do | do | do | Do. |
| 18 | do | 59.93 to 60.00 | do | do | do | do | do | do | do | do | closed | Do. | contact set $A_s$ is up which results in no sample streams being passed into cell 16. During step 18 contact set $S_3$ is closed so as to once again apply the output signals from amplifier 185 to motor 187. The next step following 18 is a repeat of step 1.

Because the composition of the sample streams under consideration may not vary appreciably from one another it is desirable that means be provided for indicating transition from one sample stream to another on recorder 142. This is accomplished by stream marking disk 122 shown in Figure 2. Each time there is a transition from one sample stream to the other a surge of current passes through disk 122 thereby energizing relay 137 which in turn applies ground potential through lead 141 to recorder 142. This temporary grounded connection shorts out the applied signal to recorder 142 thereby making a mark which is indicative of the transition from one sample stream to another.

Amplifier 185 is particularly adapted to amplify the unbalance voltage from the bridge circuit to drive motors 186 and 187. To minimize the effects of extraneous electrical signals grounded electrostatic shields 163 and 164 enclose the respective windings of transformer 162, grounded shields 169 and 170 enclose leads 165 and 166, and grounded shields 387 and 180 enclose respective leads 386 and 388. Transformer 240 and tubes 242, 250 are enclosed in a magnetic shield 320, and the lead connecting the anode of tube 250 to the control grid of tube 260 is enclosed in a shield 321. The filament heaters of tubes 242, 250 are supplied by direct current from leads 217 and 218.

To reduce the effects of stray capacitance and leakage resistance in the measuring circuit, a potentiometer 167 having its contactor grounded is connected in parallel across the secondary winding of transformer 162. The resistance of the potentiometer can be of the order of 250 ohms, for example. A lead 323 is connected to the cathode of tube 269 and to one plate of a capacitor 324, the second plate of which is connected to one terminal of a rectifier 326 and also grounded through a resistor 325. The second terminal of rectifier 326 is connected by a lead 328 to one terminal of a sensitive current meter 329, the second terminal of which is grounded. In operation the bridge is first balanced as well as possible by motor 187. The contactor of potentiometer 167 then is adjusted manually until meter 329 indicates minimum current flow therethrough. This places the input terminals $h$ and $i$ of amplifier 185 at ground potential such that any capacitance between the contactor of potentiometer 183 and ground and between the contactor of potentiometer 178 and ground has no effect because there is no potential difference between these points and ground. Increased sensitivity is obtained in this initial measurement by amplifying the stray capacitance unbalance before indication on meter 329. This amplification is provided by triodes 242, 250, 260, and 269 of amplifier 185.

The parallel-T filter which comprises capacitors 288, 289, and 287 and resistors 285, 286, and 290, is disposed between the anode of tube 278 and the control grid thereof to minimize the transmission through the amplifier of stray voltages of frequencies other than 60 cycles. Such signals do not drive the balance motors, but do cause heating of the motor coils. This filter is tuned to 60 cycles and as such presents high impedance to 60 cycle signals and relatively low impedance to other signals. Accordingly, at frequencies other than 60 cycles, which the amplifier would normally pass, the parallel-T network provides some transmission to apply degenerative feedback to the grid of tube 278. Representative values of the circuit components which will provide such transmission through the amplifier of only the 60 cycle signal are as follows: capacitors 288 and 289, each .01 microfarad; capacitor 287, .02 microfarad; resistors 285 and 286, 265,000 ohms; and resistor 290, 132,500 ohms.

The output stage of amplifier 185 comprises parallel tubes 296 and 297, the anodes of which are connected to respective end terminals of transformer winding 307. The center tap of winding 307 is grounded through coils 191 and 192 of respective motors 204 and 205. Because the anode of one of tubes 296, 297 is positive while the other is negative, each tube conducts during alternate half cycles of applied voltage. In the absence of a signal on the control grids the output of the two tubes consists of two pulses per cycle such that if the two pulses are equal there is no 60 cycle component in the output. However, if a 60 cycle signal either in phase or 180° out of phase with the operating voltage is applied to the control grids of tubes 296 and 297, one of the output pulses is increased and the other decreased, thereby providing a 60 cycle component in the output. By providing tubes 296' and 297' in parallel with tubes 296 and 297 a safety factor is established should one of the tubes fail. Capacitors 206 and 207 in series with respective motor windings 204 and 205 shift the current vector 90° in relation to the current in the amplifier output windings 191 and 192, thus providing a rotating magnetic field to drive the motors.

In order to provide a simple determination of proper operation of the electrical circuit components a pair of resistors 340 and 341 are connected in parallel across element 18 through the armature 315 of a relay 316. Normally the contact through relay 316 is open such that resistors 340 and 341 are out of the circuit. One terminal of the coil of relay 316 is grounded and the other connected to voltage terminal $o$ through a switch 317 and a lead 319. Closure of switch 317 actuates relay 316 to connect series resistors 340 and 341 in parallel with element 18 thereby establishing a deflection on recorder 142 of preselected magnitude if the circuit is operating in proper manner. Typical ohmic values of these components can be as follows: element 18, 1500 ohms; and resistors 340 and 341, 10 megohms each.

From the foregoing description it should be apparent that there is provided in accordance with this invention and analyzer unit adapted to measure sequentially the composition of a plurality of sample streams. The analyzer also is equipped to be rebalanced from a standard stream in a periodic manner. This standard stream can comprise any material having constant absorption characteristics similar to the samples under consideration. In addition, improved electrical circuitry is provided for operating the analyzer unit, this circuitry including a frequency selective amplifier. While this invention has been described in conjunction with a present preferred embodiment, it should be apparent that various modifications can be made by those skilled in the art without departing from the scope of this invention.

Having described my invention, I claim:

1. In an analyzer including a Wheatstone bridge circuit having radiation sensitive elements disposed in two arms thereof, and a source of alternating voltage applied across opposite terminals of said bridge; a potentiometer having the end terminals thereof connected across said voltage source, the contactor of said potentiometer being maintained at a point of reference potential; a pair of variable impedances connected in said bridge circuit; motor-driven means responsive to electrical unbalance of said bridge circuit for adjusting the value of at least one of said impedances to restore said bridge to balance; and means for minimizing the effect of extraneous electrical signals which may be introduced into the motor circuit which do not tend to actuate said motor-driven means comprising, in combination, means for amplifying the unbalance bridge signal applied to said motor-driven means, and means for detecting the components of the amplified signal which are not of the same frequency and phase as the bridge unbalance signal derived from said voltage source, whereby the contactor of said potentiometer can be adjusted to reduce to a minimum the components of said amplified signal which do not actuate said motor-driven means.

2. In an alternating current bridge circuit including motor-driven means adapted to vary the impedance of at lease one element of said bridge circuit to maintain electrical balance of said bridge circuit, the improvement comprising, in combination, a potentiometer having the end terminals thereof applied across the alternating current voltage source operating said bridge circuit, the contactor of said potentiometer being maintained at a reference potential, an amplifier connected to said bridge to amplify the unbalance bridge signal applied to said motor-driven means, and detecting means to measure any components of the amplified signal which are of phase such as not to actuate said motor-driven means whereby the contactor of said potentiometer can be adjusted to minimize the components of said amplified signal which do not actuate said motor-driven means.

3. In an alternating current bridge circuit including motor-driven means adapted to vary the impedance of at least one element of said bridge circuit to maintain electrical balance of said bridge circuit, means for minimizing the effects of extraneous electrical signals which may be introduced into the analyzer circuit out of phase with the unbalance signal derived from the voltage source applied across said bridge, said extraneous signals not tending to actuate said motor-driven means, comprising in combination, means for amplifying the unbalance signal applied to said motor-driven means from said bridge circuit, the resulting amplified signal including any extraneous signals introduced into the circuit, and means for detectng the components of said amplified signal which are out of phase with the signal actuating said motor-driven means whereby the contactor of said potentiometer can be adjusted to reduce to a minimum the components of said amplified signal which are not in phase with the unbalance signal which actuates said motor-driven means.

4. A frequency selective amplifier adapted to pass a preselected frequency band comprising, in combination, an electrical discharge device having at least an anode, a cathode, and a control grid, means for applying an input signal to the cathode of said device, an electric filter adapted to impede said preselected frequency band, said filter being connected between said anode and said control grid to provide degenerative feedback for the frequencies passed by said filter, and an output circuit connected to said anode.

5. The combination in accordance with claim 4 wherein said filter comprises a parallel-T resistance-capacitance network adapted to provide maximum attenuation of the frequency band selectively passed by said amplfier.

6. A frequency selective amplifier adapted to pass a preselected frequency band comprising, in combination, an electrical discharge device having at least an anode, a cathode, and a control grid, an input circuit applied between said cathode and a point of reference potential, an output circuit applied between said anode and said point of reference potential, and an electric filter connected between said anode and said control grid, said filter comprising first and second resistors connected in series between said anode and said control grid, first and second capacitors connected in series between said anode and said control grid, a third capacitor connected between said point of reference potential and the junction between said first and second resistors, and a third resistor connected between said point of reference potential and the junction between said first and second capacitors, the values of said resistors and capacitors being proportioned such that said filter provides maximum attenuation of the frequency band selectively passed by said amplifier.

7. An analysis instrument comprising, in combination; an alternating current Wheatstone bridge circuit having radiation sensitive elements disposed in two arms thereof; a frequency selective amplifier applied across said bridge to amplify electrical unbalance of said bridge, said amplifier including an electrical discharge device having at least an anode, a cathode and a control grid, means for applying an input signal to the cathode of said device, an electric filter adapted to impede signals of frequency the same as frequency of the operating voltage applied across said bridge, said filter being connected between said anode and said control grid to provide degenerative feedback for the frequencies passed by said filter, and an output circuit connected to said anode; and motor-driven means actuated by the output of said amplifier for adjusting at least one impedance element of said bridge to restore electrical balance across said bridge.

8. An analysis instrument comprising, in combination; an alternating current Wheatstone bridge circuit having radiation sensitive elements disposed in two arms thereof; a tuned amplifier applied across said bridge to amplify electrical unbalance of said bridge, said amplifier including an electrical discharge device having at least an anode, a cathode and a control grid, an input circuit applied between said cathode and a point of reference potential, an output circuit applied between said anode and said point of reference potential, and an electric filter connected between said anode and said control grid, said filter comprising first and second resistors connected in series between said anode and said control grid, first and second capacitors connected in series between said anode and said control grid, a third capacitor connected between said point of reference potential and the junction between said first and second resistors, and a third resistor connected between said point of reference potential and the junction between said first and second capacitors, the values of said resistors and capacitors being proportioned such that said filter provides maximum attenuation of the frequency of the operating voltage applied across said bridge; and motor-driven means actuated by the output of said amplifier for adjusting at least one impedance element of said bridge to restore electrical balance across said bridge.

9. A tuned amplifier comprising, in combination, a first vacuum tube having at least an anode, a cathode and a control grid, means for applying an input signal to the control grid of said first vacuum tube, a second vacuum tube having at least an anode, a cathode and a control grid, the cathodes of said first and second tubes being connected to one another, an output circuit connected to the anode of said second tube, and an electric filter connected between the anode and the control grid of said second tube, said filter comprising first and second resistors connected between the anode and the control grid of said second tube, first and second capacitors connected in series between the anode and the control grid of said second tube, a third capacitor connected between a point of reference potential and the junction between said first and second resistors, and a third resistor connected between said point of reference potential and the junction between said first and second capacitors, the values of said resistors and capacitors being proportioned such that said filter provides maximum attenuation of the frequency band selectively passed by said amplifier.

10. The combination in accordance with claim 7 wherein said filter comprises a parallel-T resistance-capacitance network adapted to provide maximum attenuation of the frequency of the operating voltage applied across said bridge, said frequency being the frequency selectively passed by said amplifier.

References Cited in the file of this patent

UNITED STATES PATENTS

| 1,732,702 | Tannehill | Oct. 22, 1929 |
| 1,926,190 | Borden | Sept. 12, 1933 |
| 2,180,035 | Cleghorn | Nov. 14, 1939 |
| 2,372,419 | Ford et al. | Mar. 27, 1945 |

(Other references on following page)

UNITED STATES PATENTS

| | | |
|---|---|---|
| 2,435,366 | Riche | Feb. 3, 1948 |
| 2,452,587 | McCoy | Nov. 2, 1948 |
| 2,577,735 | Broomell | Dec. 11, 1951 |
| 2,579,825 | Hutchins | Dec. 25, 1951 |
| 2,584,386 | Hare | Feb. 5, 1952 |
| 2,604,778 | Marquardt | July 29, 1952 |
| 2,611,005 | Wilson | Sept. 16, 1952 |
| 2,621,298 | Wild et al. | Dec. 9, 1952 |
| 2,622,157 | McGuire et al. | Dec. 16, 1952 |
| 2,721,942 | Friel et al. | Oct. 25, 1955 |